United States Patent Office 2,799,682
Patented July 16, 1957

2,799,682

5(S)10(N)ISOTHIAZOLOBENZANTHRACENE-DIOXIDES

William B. Hardy, Bound Brook, N. J., and Oscar G. Birsten, New York, N. Y., assignors to American Cyanamid Company, New York, N. Y., a corporation of Maine No Drawing. Application August 9, 1954,
Serial No. 448,754

10 Claims. (Cl. 260—304)

This invention relates to new intermediates for vat dyes, and more particularly to the 5(S)10(N)isothiazolobenzanthracenedioxides and their Bz-1-halogen, nitro and amino derivatives.

Quinone sulfimines having the structures

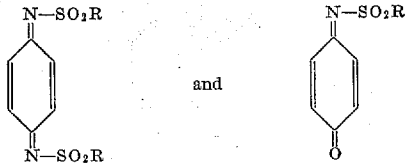

and the corresponding naphthoquinone and anthraquinone derivatives, have recently been described by Adams et al. in a series of articles appearing in the "Journal of the American Chemical Society." These compounds are very sensitive to alkali, losing sulfonic acid and ammonia when heated with strong alkali. Consequently, such compounds are useless in the preparation of fused ring systems of the benzanthrone and dibenzanthrone type where alkali fusion to produce such ring systems is required.

The present invention is based upon the discovery that a somewhat analogous cyclic structure in which the $SO_2$ group is ring closed into the anthraquinone system is stable to alkali fusion and is highly useful in the preparation of condensed ring systems needed for the deep shades of vat dyes. We have found that the isothiazolodioxide ring system, as described more particularly hereinafter, may be used to prepare a novel benzanthrone analog by the standard benzanthrone synthesis. Moreover, the benzanthrone analog can be transformed into dibenzanthronyl, dihydroxy- and dimethoxydibenzanthrones by the usual reagents. Furthermore, bromination of the novel benzanthrone analog produces a bromobenzanthrone analog which can be condensed with alpha-aminoanthraquinones to form anthrimides and which may then be fused in alcoholic alkali in a standard manner to produce acridine vat dyes.

It is a surprising feature of the present invention that the isothiazolodioxide ring system survives the drastic step of alkali fusion at high temperatures when the analogous open chain quinone sulfimines are readily decomposed by this treatment.

The preparation of the novel intermediates of the present invention may be carried out by first treating 1(S)9(N)isothiazoloanthraquinonedioxide of the structure

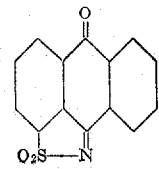

and which may be prepared by the method of Ullmann and Kertesz, [Ber. 52, 545 (1919)], with glycerin, sulfuric acid and a reducing metal in the standard benzanthrone condensation to produce 5(S)10(N)isothiazolobenzanthracenedioxide of the structure

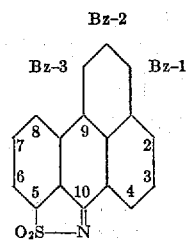

The numbering system used is shown in the above formula. It is believed that this is the correct structure because it is highly unlikely that the formation of the new ring would occur by ring closure into a ring already substituted by a sulfonyl group, especially when an unsubstituted ring is equally available. However, this point is not certain and we do not wish to be limited thereby.

The basic ring system could also be named as 5(S)10(N)isothiazolobenzanthronedioxide, or by the Chemical Abstracts system as benzonaptheno[1,2,3,-c,d][1,2]benzisothiazole 2,2-dioxide or phenaleno[1,2,3,-c,d][1,2]benzisothiazole 2,2-dioxide:

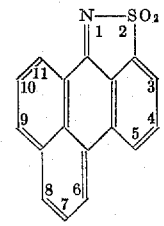

By frequently used oxa-aza system, the name would be 2-thia-1-aza-2H-benz[h, i]acenthrylene-2,2-dioxide. The characteristics of the compound are accentuated by naming the compound as an isothiazolobenzanthracenedioxide, and such terminology is used elsewhere in this specification.

The novel isothiazolobenzanthracenedioxide can be brominated in acetic acid to produce Bz-1-bromo-5(SB)-10(N)isothiazolobenzanthracenedioxide. Chlorination of the isothiazolobenzanthracenedioxide can also be carried out to give the related chloro compounds, although the brominated compounds are preferred since they react more readily with aminoanthraquinones. Even a large excess of bromine is found to give a mono-bromo derivative. By analogy with the bromination of benzanthrone such substitution is in all probability at the Bz-1 position. The novel intermediates can be readily condensed with aminoanthraquinones to give anthrimides which may then be ring closed by fusion in a potassium hydroxide methanol mixture to produce acridine green dyes.

These reactions are believed to go through the following scheme, using alpha-aminoanthraquinone for purposes of illustration.

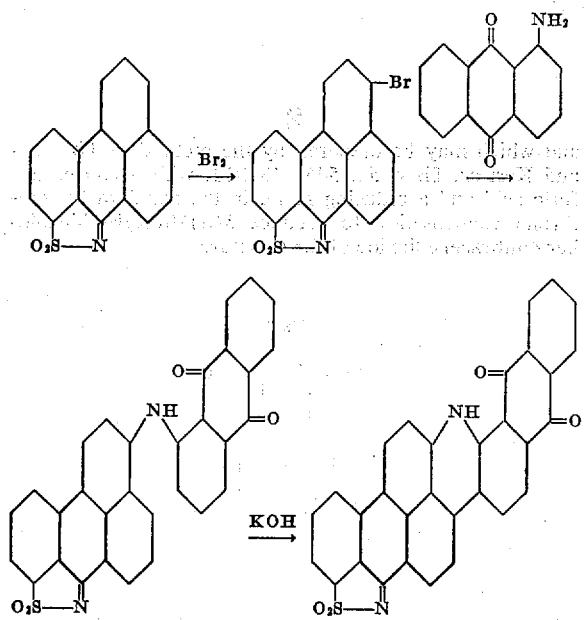

The isothiazolobenzanthracenedioxide can also be nitrated. Reduction of the nitro compound with ferrous sulfate and ammonia readily gives the amino derivative. This too may be condensed with halogenoanthraquinones to give anthrimides similar to those prepared from the bromo substituted isothiazolobenzanthracenedioxide.

The isothiazolobenzanthracenedioxide can be fused with potassium hydroxide in methanol to give an analog of 2,2'-dibenzanthronyl of the formula

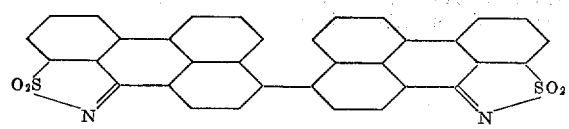

This product is itself vattable and dyes cotton a yellow shade. This dibenzanthronyl analog may be oxidized by manganese dioxide in 82% sulfuric acid to produce dihydroxydiisothiazolodibenzanthracenedioxide of the formula

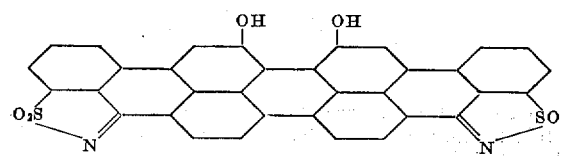

The above product has many of the characteristics of dihydroxydibenzanthrone. For example, the novel dye has a red fluorescence in solution and gives a fluorescent blue shade. It can be methylated by heating with paratoluene sulfonic acid methyl ester to produce the dimethoxy analog

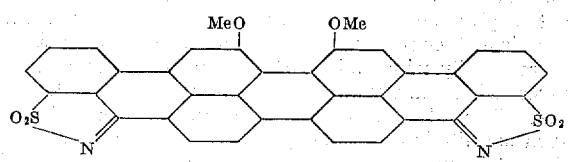

This product is a desirable yellow-green shade dye which is much yellower than that of the corresponding dimethoxydibenzanthrone. Greenish-blue dyes are obtained by heating the dihydroxydiisothiazolodibenzanthracenedioxide with ethylene bromide.

The novel intermediate may also be prepared with substituents in the ring. Thus, for example, Bz-2-methyl and Bz-2-phenyl derivatives can be prepared by the use of methacrolein and 2-phenylacrolein, respectively, instead of glycerin or acrolein in the standard benzanthrone synthesis.

Also, the isothiazoloanthraquinonedioxide may be prepared from substituted anthraquinones, as, for example, when 1-sulfo-2-methylanthraquinone is used, an isothiazolobenzanthracenedioxide is obtained in which a methyl group is ortho to the sulfur on the 6 position in the ring. In a similar manner isothiazolobenzanthracenedioxides with substituents in the anthraquinone ring may be prepared by using 1-sulfoanthraquinones containing substituents such as alkoxy, aryloxy, carboxy, nitro and halogen in positions other than 5 and 10 in the ring system.

The invention will be described in greater detail in conjunction with the following specific examples in which the parts are by weight unless otherwise specified.

*Example 1*

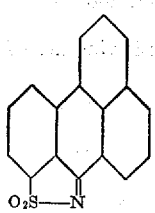

A mixture of 5.4 parts of 1(S)9(N) isothiazoloanthraquinonedioxide, 3.1 parts of glycerin, 1.2 parts of hydrated copper sulfate, and 6.1 parts of water is stirred while 51.9 parts of concentrated sulfuric acid are added, the temperature being kept below 90° C. The mixture is then heated to 105° C. and 1.9 parts of zinc dust are added gradually at this temperature. The mixture is then drowned and the product is isolated by filtration. The filter cake is thoroughly extracted with dilute sodium hydroxide solution at room temperature after which the product is filtered, washed, and dried. It is a dark greenish-yellow solid which does not vat and does not melt below 320° C. It is insoluble in most organic solvents but slightly soluble in boiling nitrobenzene.

*Example 2*

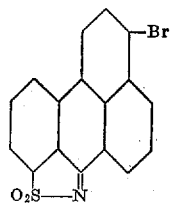

Five parts of the product of Example 1 are dissolved in 100 parts of sulfuric acid and the mixture is drowned. The precipitated product is filtered and washed acid free. The cake is then slurried in a mixture of 30 parts of water and 5 parts of concentrated hydrochloric acid. A solution of 31.2 parts of bromine in 30 parts of acetic acid is then added and the mixture is heated to 65° C. until bromination is complete. The reaction mixture is then drowned and excess bromine is destroyed with bisulfite. The product is isolated by filtration, washing, and drying. It is recrystallized from nitrobenzene and gives a good analysis for a monobromoisothiazolobenzanthracenedioxide. It is observed to have a melting point of 318–320° C.

Example 3

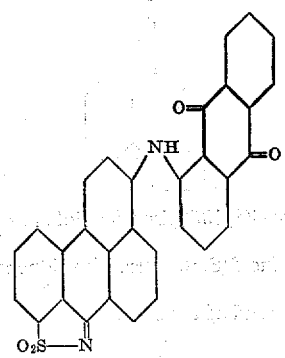

A mixture of 2.1 parts of the product of Example 2, 1.3 parts of alpha-aminoanthraquinone, 0.2 parts of powdered copper, 0.2 parts of iodine, 3 parts of anhydrous potassium carbonate, and 36 parts of nitrobenzene is stirred at 210° C. until the reaction is substantially complete. The mixture is then cooled to room temperature and the precipitated product is filtered and washed with nitrobenzene and alcohol. It is then slurried in dilute hydrochloric acid and the final product is isolated by filtration and washing.

Example 4

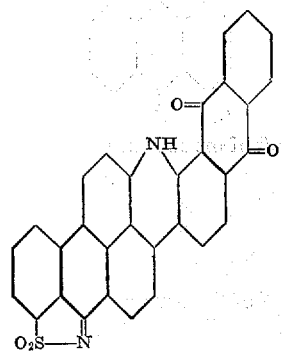

72 parts of potassium hydroxide and 40 parts of methyl alcohol are stirred together and heated to reflux. The resultant clear solution is then cooled to 140° C. and 2 parts of the product of Example 3 are added. The mixture is stirred at 147–150° C. until the reaction is substantially complete. No odor of ammonia is detectable throughout this reaction. The reaction mixture is drowned and the precipitated product is isolated by filtration and washing. The resultant product dyes cotton an olive green shade of excellent fastness to light.

Example 5

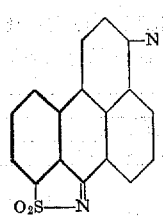

5 parts of the product of Example 1 are added at room temperature to 74 parts of 85% nitric acid forming a red solution. The mixture is gradually warmed to 60° C. The red solution changes to a yellow solution containing a crystalline precipitate. When the reaction is substantially complete, the mixture is cooled and the precipitated product is filtered, washed with 50% nitric acid, and then with water. The product gives, on recrystallization from nitrobenzene, a mononitroisothiazolobenzanthracenedioxide.

Example 6

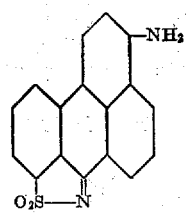

15 parts of the product of Example 5 are dissolved in 280 parts of concentrated sulfuric acid. The resultant solution is drowned and the precipitate is filtered and washed until neutral. The wet cake is slurried in a mixture of 300 parts of water and 300 parts of concentrated ammonia hydroxide. 50 parts of crystalline ferrous sulfate are added and the mixture is boiled until reduction is substantially complete. The mixture is then cooled and the product is isolated by filtration and washing. It is purified by reslurrying and stirring in dilute hydrochloric acid followed by refiltration and washing. The resultant red product does not melt under 300° C.

Example 7

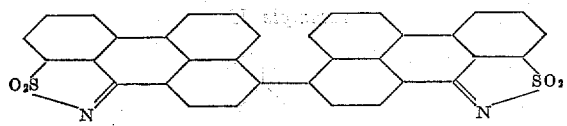

A melt is prepared by mixing 30 parts of potassium hydroxide, 3 parts of anhydrous sodium acetate, and 20 parts of methanol and stirring the mixture while heating to approximately 100° C. 5 parts of the product of Example 1 are then added gradually and the mixture is stirred until the reaction is substantially complete. The mixture is then drowned in water and aerated. The resultant precipitate of a yellow brown solid is isolated by filtration and washing. The vat readily dyes cotton a yellow shade. It is completely insoluble in most organic solvents.

Example 8

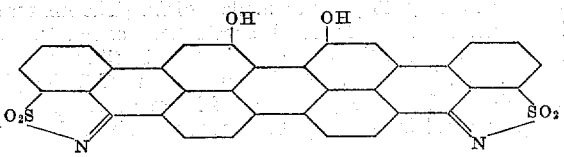

10 parts of the product of Example 7 are dissolved in 200 parts of sulfuric acid. Sufficient water is added to dilute the acid to 80% sulfuric acid strength. The mixture is then cooled to 15° C. and 12 parts of manganese dioxide are added gradually. The mixture is then allowed to cool to room temperature and is stirred until the reaction is substantially complete. The reaction mixture is filtered and the cake is washed with 80% sulfuric acid. The cake is then dissolved in 100% sulfuric acid keeping the mixture cold and the solution is filtered to remove organic matter. The filtrate is drowned and the resultant slurry is boiled with excess sodium bisulfite. The precipitated product is isolated by filtration and washing. It is a dark green solid which dissolves in sulfuric acid to give a purple color and which vats in alkaline hydrosulfite to give a blue shade with a reddish fluorescence.

Example 9

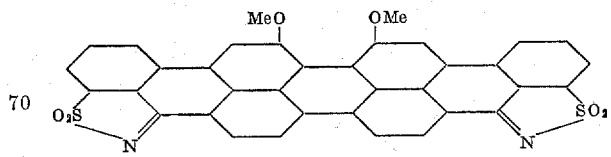

1 part of the product of Example 8, 3 parts of anhydrous potassium carbonate, 3 parts of methyl para-toluene sulfonate and 30 parts of nitrobenzene are stirred at 170°

C. until the methylation is substantially complete. The mixture is filtered while still hot and the product is washed with nitrobenzene followed by alcohol and water. The resultant product dissolves in alkaline hydrosulfite to give a blue shade and dyes cotton a very yellowish green shade.

*Example 10*

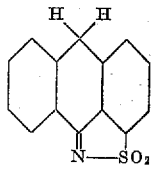

A solution of 9.6 parts of 1(S)9(N)isothiazoloanthraquinonedioxide in 106 parts of 96% sulfuric acid is stirred and cooled while 4.2 parts of water are added. The temperature is then adjusted to 38° to 42° C. and 4.8 parts of copper powder are added gradually. The mixture is then stirred at about 40° C. until the reaction is complete. The product is isolated by drowning in water, filtering, washing, and drying.

*Example 11*

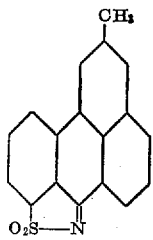

A mixture of 100 parts of acetic acid, 2 parts of pyridine, and 5 parts of acetic anhydride is heated to 75°–80° C. To this is then added 1 part of concentrated sulfuric acid, followed by 65 parts of the product of Example 10, and then by 23 parts of methacrolein. The mixture is refluxed until the reaction is substantially complete. It is then cooled and the product is isolated by filtration.

Similarly, by using an equivalent amount of 2-phenylacrolein, the Bz-2-phenyl compound is prepared.

When acrolein is used, the product of Example 1 is formed.

We claim:

1. 5(S)10(N)isothiazolobenzanthracenedioxides and their Bz-1-halogen, Bz-1-nitro and Bz-1-primary amino derivatives.

2. The compound of the structure

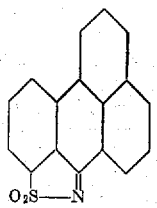

3. The compound of the structure

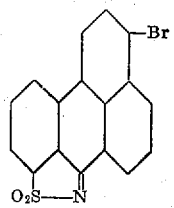

4. A Bz-nitro-5(S)10(N)isothiazolobenzanthracenedioxide.

5. A Bz-amino-5(S)10(N)isothiazolobenzanthracenedioxide.

6. The compound of the structure

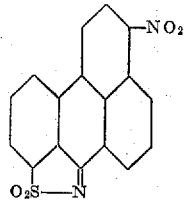

7. The compound of the structure

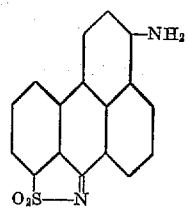

8. The dyestuff of the structure

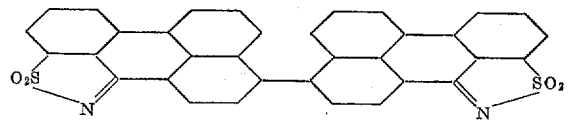

9. The dyestuff of the structure

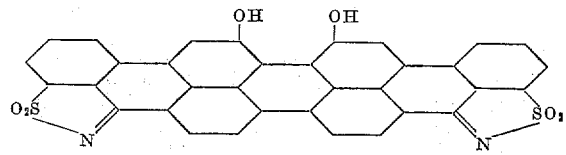

10. The dyestuff of the structure

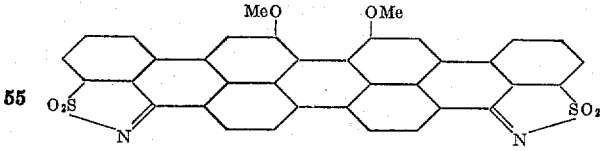

References Cited in the file of this patent

UNITED STATES PATENTS

| | | |
|---|---|---|
| 1,845,469 | Wolff | Feb. 16, 1932 |
| 2,203,416 | Lycan | June 4, 1940 |
| 2,468,577 | Dormael et al. | Apr. 26, 1949 |
| 2,485,679 | Van Zandt et al. | Oct. 25, 1949 |

UNITED STATES PATENT OFFICE

CERTIFICATE OF CORRECTION

Patent No. 2,799,682                              July 16, 1957

William B. Hardy et al.

It is hereby certified that error appears in the printed specification of the above numbered patent requiring correction and that the said Letters Patent should read as corrected below.

Column 1, line 32, after "alkali" insert a period; column 2, line 55, for "Bz-1-bromo-5(SB)-" read -- Bz-1-bromo-5-(S)- --; column 3, line 48, for "managanese" read -- manganese --.

Signed and sealed this 26th day of November 1957.

(SEAL)

Attest:
KARL H. AXLINE
Attesting Officer

ROBERT C. WATSON
Commissioner of Patents